United States Patent
Finzi et al.

(10) Patent No.: US 11,367,024 B2
(45) Date of Patent: Jun. 21, 2022

(54) METHOD FOR GENERATING A SCHEDULE FOR MIXED CRITICAL COMPUTER NETWORKS

(71) Applicant: TTTech Computertechnik Aktiengesellschaft, Vienna (AT)

(72) Inventors: Anaïs Finzi, Vienna (AT); Silviu S. Craciunas, Vienna (AT); Ramon Serna Oliver, Vienna (AT)

(73) Assignee: TTTECH COMPUTERTECHNIK AKTIENGESELLSCHAFT, Vienna (AT)

( * ) Notice: Subject to any disclaimer, the term of this patent is extended or adjusted under 35 U.S.C. 154(b) by 0 days.

(21) Appl. No.: 17/011,250

(22) Filed: Sep. 3, 2020

(65) Prior Publication Data

US 2021/0073689 A1 Mar. 11, 2021

(30) Foreign Application Priority Data

Sep. 9, 2019 (EP) .................................... 19196173

(51) Int. Cl.
*G06Q 10/06* (2012.01)
*H04L 12/43* (2006.01)
(Continued)

(52) U.S. Cl.
CPC ............. *G06Q 10/06* (2013.01); *H04L 12/43* (2013.01); *H04L 47/564* (2013.01); *H04L 67/325* (2013.01)

(58) Field of Classification Search
CPC ....... G06Q 10/06; H04L 12/43; H04L 47/564; H04L 67/325
See application file for complete search history.

(56) References Cited

U.S. PATENT DOCUMENTS

| 2003/0189922 A1 | 10/2003 | Howe |
| 2006/0013245 A1 | 1/2006 | Abedi |

(Continued)

FOREIGN PATENT DOCUMENTS

| GB | 2390775 A | 1/2004 |
| KR | 20100118475 A | 11/2010 |

OTHER PUBLICATIONS

Search Report for European Patent Application No. 19196173.9, dated Feb. 19, 2020 (21 pages).
(Continued)

*Primary Examiner* — Ronald B Abelson
(74) *Attorney, Agent, or Firm* — Eversheds Sutherland (US) LLP

(57) ABSTRACT

A method for generating a schedule for the transmission of time-triggered, TT, messages in a network, wherein said network communicates TT messages according to said schedule and based on a global, network-wide time, wherein said network communicates rate-constrained, RC messages, wherein for each of said RC messages real-time requirements are provided, wherein the method comprises: Step 1: setting the transmission time of all TT messages which are communicated in the network, and Step 2: executing a search function to find a set of TT transmission times so that the real-time requirements of all RC messages are fulfilled, and when all real-time requirements or at least real-time requirements for defined RC messages are fulfilled, generating in Step 3: the schedule based on the transmission times retrieved in Step 2, or executing Step 2 again when not all real-time requirements or not all real-time requirements for the defined RC messages are fulfilled.

12 Claims, 4 Drawing Sheets

(51) Int. Cl.
*H04L 12/875* (2013.01)
*H04L 29/08* (2006.01)
*H04L 47/56* (2022.01)
*H04L 67/62* (2022.01)

(56) References Cited

U.S. PATENT DOCUMENTS

2006/0242252 A1  10/2006  Jiang
2008/0137679 A1   6/2008  Horst et al.
2019/0104055 A1   4/2019  Craciunas et al.
2019/0109728 A1*  4/2019  Steiner .................... H04L 12/40

OTHER PUBLICATIONS

Steiner, Wilfried, "An Evaluation of SMT-Based Schedule Synthesis for Time-Triggered Multi-Hop Networks," pp. 375-384, 2010 31st IEEE Real-Time Systems Symposium, published Nov. 1, 2010 (10 pages).

* cited by examiner

METHOD FOR GENERATING A SCHEDULE FOR MIXED CRITICAL COMPUTER NETWORKS

CROSS-REFERENCE TO RELATED APPLICATIONS

This disclosure claims priority to and the benefit of EP Patent Application No. 19196173.9, filed Sep. 9, 2019, which is hereby incorporated by reference herein in its entirety.

FIELD

The invention relates to a method for generating a schedule for the transmission of time-triggered, TT, messages in a network, for example in a TTEthernet or TSN network, wherein the network comprises components, for example nodes and starcouplers, wherein components of said network communicate time-triggered messages according to said schedule and based on a global, network-wide time, and wherein said components communicate rate-constrained, RC messages, wherein for each of said RC messages real-time requirements are provided.

Furthermore the invention relates to a computer network, for example a TTEthernet or TSN network, wherein the network comprises components, for example nodes and starcouplers, wherein components of said network communicate time-triggered messages according to said schedule and based on a global, network-wide time, and wherein said components communicate rate-constrained, RC messages, wherein for each of said RC messages real-time requirements are provided.

For example said components, in particular said nodes and star couplers, are arranged in a multi-hop fashion.

BACKGROUND

A computer network, for instance an IEEE 802.3 Ethernet (Institute of Electrical and Electronics Engineers 2018) or TSN (Institute of Electrical and Electronics Engineers 2017), can carry both scheduled and unscheduled communication messages, whereby scheduled communication (time-triggered or TT) messages are transmitted from a sending entity (component) to one or more receiving components (entities) at predefined points in time in a network-wide well-defined time, while unscheduled communication messages are transmitted according to other criteria. Appropriate transmission protocols and mechanisms for message handling and message prioritization can be applied, whereby it is ensured that no interference of any scheduled or unscheduled communication message with any given scheduled communication message can occur.

Non-scheduled messages can be of two types: Rate-Constrained (RC) and Best-Effort (BE). RC traffic is sent with a minimum interarrival-time called BAG (Institute of Electrical and Electronics Engineers 2018) and typically has real-time requirements on the maximum allowed end-to-end latency and jitter. BE traffic does not have any real-time requirements.

In mixed-criticality networks (i.e., networks that have TT, RC and BE traffic), the communication schedule for TT messages influences the timely behaviour of RC and BE messages due to the fact that TT messages have higher priority over RC and BE messages and are sent first, hence delaying the transmission of RC and BE messages. Hence, the TT communication schedule may adversely affect the transmission of RC messages such that they do not adhere to their real-time requirements.

SUMMARY

It is an objective of the invention to generate a schedule for networks, in which at least time-triggered messages and RC messages are communicated.

This object is achieved a method as mentioned above, wherein according to the invention said method is characterized by the following steps:
Step 1: setting the transmission time of all TT messages which are communicated in the network, and
Step 2: executing a search function to find a set of TT transmission times so that the real-time requirements of all RC messages are fulfilled, and in the case, that all real-time requirements or at least real-time requirements for defined RC messages are fulfilled, generating in a
Step 3: the schedule based on the transmission times retrieved in Step 2,
or executing Step 2 again in case that not all real-time requirements or not all real-time requirements for the defined RC messages are fulfilled.

For example, it may be provided that the real-time requirements demand or at least demand that the end-to-end travel time for defined RC flows, in particular for each RC flow fulfills its deadline.

According to the invention it may be provided to evenly space the TT transmission times to reduce the impact of TT flows on RC flows so that for example the RC worst-case end-to-end travel times (time needed for a message to go from its source to its destination) may be smaller than the deadlines.

Further advantages of the invention, which alone or in any arbitrary combination may be realised, are described in the following:
The transmission times of all the TT messages may be set, in particular for one TT flow after the other, using an optimization function, preferably with an SMT-solver.
The real-time requirements for the RC messages may comprise an end-to-end delay bound, and wherein the search function in Step 2 is loop based with the following loop-steps:
loop-step 1: comparing the worst-case end-to-end delay bound of each RC flow with its corresponding deadline, wherein in case that the delay bound is larger than the corresponding deadline according to the RC requirements for said RC flow, the next two loop steps are executed:
loop step 2: identifying TT transmission times to be modified, and
loop step 3: computing of the transmission times of the selected TT flows in loop step 2, preferably for each output port of the flow path of a selected TT flow, for example using an optimization function within the SMT-solver.
Here, loop step 2 will help to guide the search to the most promising parts of a solution space.
If in loop step 1 the delay bound is smaller, a solution is found and the search stops.
A record of the previously explored option can be kept, which may be used to guide the search into unexplored parts of the solution space and/or to be used as an additional stopping condition for the search.

The search function (search algorithm) comprises an identification of TT transmission times to be modified based on a Network Calculus framework and an arrival curve in each output port, which represents the maximum amount of data that can arrive in an output port in any time interval of TT traffic detailed. This method is detailed in L. X. Zhao, H. G. Xiong, Z. Zheng, and Q. Li. *Improving worst-case latency analysis for rate-constrained traffic in the time-triggered Ethernet network*.

A staircase curve for each output port of the network crossed by TT flows may be computed, wherein the staircase curves are approximated by linear curves, and wherein TT flows having an impact, in particular a large impact on RC flows, in particular on the real-time requirements of the RC flows, are identified by intersecting a staircase curve and its linear approximation, the flow most likely to have a large impact on RC flows is identified (see also detailed description under "findBestFlow( )"). This computing is detailed for example in L. X. Zhao.

The computation of the TT transmission times may be executed with the use of an optimization function, which preferably is added within the SMT-solver, and wherein a set of TT flows with a hyper-period, HP, which is the least common multiple of all flow periods of all TT flows, is considered, and wherein for each output port, where TT flows occur, a gain function is defined. Defining a gain function may guide the search of a good transmission time, i.e. a time which will have a low impact on RC end-to-end delays.

For the computation of transmission times, gain functions between the already scheduled TT frames may be determined, wherein with $t^{end}_k$ being the end of a frame transmission and $t^{start}_{k+1}$ being the start of the next transmission, for each TT frame already scheduled, the gain functions are determined by:

$$\forall\, t^{end}_k \le t < \frac{t^{end}_k + t^{start}_{k+1}}{2}, \text{gain}(t) = t - t^{end}_k$$

$$\forall\, t^{start}_{k+1} \ge t \ge \frac{t^{end}_k + t^{start}_{k+1}}{2}, \text{gain}(t) = t^{start}_{k+1} - t$$

wherein for each period of a flow of interest, preferably in each output port, the gain functions are summed and the abscise of the maximum value of the summed gains is selected, preferably by the SMT-solver, as the transmission time in the output port.

It may be provided that only gain functions in the acceptable times are summed, and wherein the resulting summed gain functions are approximated, in each output port, in that the abscise of the maximum value of the approximated gains is selected, preferably by the SMT-solver, as the transmission time in the output port. "Acceptable" time means time intervals where no frame are already scheduled and wherein the time interval is large enough to schedule a current frame. Accordingly, only a maximum of two linear functions per interval can be kept.

In particular, the preservation of real-time properties or the fulfilling of real-time requirements refers to the guaranteed end-to-end latency for the periodic transmission of messages between one sender node and one or several receiver nodes, via well-defined communication channels, known as virtual links (VLs). The end-to-end latency is bounded if the transmission methods ensure that the messages are transmitted at their scheduled point in time (within a small deviation derived from the clock synchronization imprecision) without occurring in contention with other scheduled or unscheduled transmissions.

The second step of the proposed method (in particular the search algorithm) may relate to changing an existing schedule for TT message transmissions, whereby the changes preserve the transmissions of already scheduled TT messages and guarantee the real-time requirements of RC messages.

In the context of this text the term "transmission times" of a TT message refers to transmission points in time/transmission instants, in particular the earliest transmission instant/point in time at which said TT message is transmitted. In particular, these are the earliest starts of transmissions allowed inside an output port, meaning the transmission of a message will start as soon as possible after this point in time (the transmission can sometimes be delayed by other messages).

In particular, it is provided that (a) the transmission of TT messages does not interfere with the transmission of other already established TT message transmissions; (b) the modification will not invalidate the real-time requirements of such TT messages, and (c) the modified transmission times of such TT messages allows RC messages to meet their real-time requirements.

In the network, preferably each node is connected to at least one star coupler via a physical link. The connection is realized via physical ports on each of the devices. Nodes and star couplers have a limited number of ports, and therefore a maximum number of connecting physical links.

All nodes and star couplers share a common notion of time by means of e.g. a time synchronization protocol like, for example, SAE AS6802 (SAE International 2011) or IEEE 802.1AS (Institute of Electrical and Electronics Engineers kein Datum).

Nodes communicate to each other by exchanging periodic time-triggered (TT) messages and rate-constrained (RC) messages.

A time-triggered message, characterized by a virtual link, has the following attributes:
A sender node
One or several receiver nodes
A period
A maximum message size
A maximum end-to-end latency
A rate-constrained message, characterized by a virtual link, has the following attributes:
A sender node
One or several receiver nodes
A minimum inter-arrival time
A maximum message size
A maximum end-to-end latency
A maximum jitter The transmission of time-triggered messages may be characterized by their VLs and follows a schedule. Each VL is routed through the network. The routing process consists of finding a multi-hop network path connecting the sender node with each of the receivers (using, for example Steiner Trees [Steiner, W. 2010. "An evaluation of SMT-based schedule synthesis for time-triggered multi-hop networks." RTSS].

For each physical link on the network path, a frame may be scheduled for periodic transmission according to the respective message attributes.

Frames are scheduled sequentially such that the transmission point in time of any intermediate hop is not scheduled before the previous frame is received at the respective hop.

The schedule point in time of each frame may be an offset relative to the period, in which the frame will be transmitted. The transmissions are repeated periodically at the given offset.

The end-to-end latency is guaranteed if the last frames are received at the receiver nodes within the maximum end-to-end latency.

During operation, nodes and star couplers transmit TT frames on each link at their scheduled points in time (within a given time precision) following the schedule for the respective link.

The schedule for a link comprises the scheduled points in time for all TT frames scheduled on that link.

The schedule repeats cyclically according to the network cycle, typically the least common multiple of the periods of all VLs.

RC frames are sent whenever there is no higher-priority TT message ready to be sent. Hence the timely behaviour of RC messages is influenced by the TT transmission schedule.

The generation of a network schedule comprising the periodic transmission of frames for all virtual links satisfying their end-to-end latency and without contention is a complex operation. Therefore, it is typically calculated and distributed offline (prior to operation). This implies that the information regarding the communication needs between nodes is also available prior to operation.

The transmission of time-triggered messages per se as characterized above during operation is prior art.

Given a time-triggered computer network as described above in operation the invention for example relates to a method to identify the TT messages that adversely impact the RC message transmission and to modify the transmission times of said TT messages in order to guarantee RC real-time requirements (these requirements may comprise the end-to-end latency, and/or jitter), wherein the transmission points in time of the respective TT frames are modified without altering the real-time properties (end-to-end latency) of the already scheduled transmissions and the real-time properties of said new VLs are guaranteed.

Additionally, the invention refers to a computer program comprising program code means for performing a method according to the invention when said program is run on a computer.

Finally, the invention relates to a computer program product comprising program code means stored on a computer readable medium for performing a method according to the invention when said program product is run on a computer.

In another embodiment, the invention relates to a method for generating a schedule for the transmission of flows in a network, said flows including time-triggered, TT flows, and rate-constrained, RC flows, each such flow comprising messages, respectively TT messages and RC messages, wherein the network comprises components, like nodes and starcouplers or other components that communicate messages between different components in the network, wherein the network is a time-triggered, TT, network or a time-sensitive, TSN network, and wherein the components of said network communicate time-triggered messages according to said schedule and based on a global, network-wide time, and wherein said components communicate rate-constrained, RC messages, wherein for each of said TT and RC messages real-time requirements are provided, and wherein for each of the RC messages, the real-time requirement provided comprises a first requirement which is a worst-case end-to-end delay bound for the transmission of the message.

The method may comprise the steps of

A1: a first search for a set of TT transmission times satisfying a first condition, the first condition being that with the set of TT transmission times applied to the TT messages, that the real-time requirements of all TT messages are fulfilled, A2: a first determination, applied to the set of TT transmission times found during the first search, of whether the found set of TT transmission times satisfies a second condition, the second condition being that with the set of transmission times applied to the TT messages, that the real-time requirements of the messages of a first set of flows are fulfilled, wherein the first set of flows is a subset of the RC flows, and wherein in the case where the found set of TT transmission times does not satisfy the second condition, the step A1 that follows include steps:

A11: a first selection of a second set of TT transmission times among the found set, the second set of TT transmission times being the TT transmission times that need to be modified in view of fulfilling the real-time requirements of the first set of flows, A12: a computation of modified transmission times of the second set of TT transmission times, the result of the computation being a new set of TT transmission times fulfilling the first condition for all TT messages.

A3: repetition, in a case where the found set of TT transmission times does not satisfy the second condition, of the steps A1 to A3 until a set of transmission times is found that satisfies the second condition, and A4: generation of the schedule such that the schedule includes the found set of TT transmission times.

It may be provided that the first search, A1, includes a second selection for choosing, among a plurality of sets of TT transmission times satisfying the first condition, the one of the plurality of sets of TT transmission times satisfying the first condition that optimizes a first optimization function, wherein the first optimization function is checked with a solver, like a Satisfiability Modulo Theory, SMT, solver, or any other solver.

It may be provided that the step A11 comprises the steps

A111: a computation of a hyper-period, HP, which is the least common multiple of all flow periods of all TT flows, A112: a third selection of the first set of flows on the basis of the hyper-period, and A113: for each output port identified as being the output port of a node of the network such that at least one of the flows of the first set of flow passes through the considered output, a computation of a gain function.

It may be provided that, step A113 comprises the steps of

A1131: the computation of gain functions for already scheduled TT frames is according to a following formula, wherein with $t^{end}_k$ being the end of a frame transmission and $t^{start}_{k+1\ being}$ the start of the next transmission:

$$\forall\, t^{end}_k \le t < \frac{t^{end}_k + t^{start}_{k+1}}{2},\ \text{gain}(t) = t - t^{end}_k$$

$$\forall\, t^{start}_{k+1} \ge t \ge \frac{t^{end}_k + t^{start}_{k+1}}{2},\ \text{gain}(t) = t^{start}_{k+1} - t$$

wherein the step A12 comprises the steps of:
- A121: for at least one of the TT flows, a computation of at least one of the TT transmission times based on the gain functions computed for the already scheduled TT frames, which step A121 comprises the steps, for each period of the considered flow and for at least one output port through which the considered flow passes:
  - A1211: computing a total gain function by summing the gain function of all the flows passing through the considered output port, and
  - A1212: selecting as a TT transmission time in the output port a time t) for which the value of the total gain function is maximum over the period of the considered flow.

It may further be provided that step A1211 comprises
- A12111: computing the gain function only for a period of the considered flow, and
- A12112: approximating the total gain functions.

It may be provided that step A1 is guided by an algorithm based on a Network Calculus, NC, framework.

It may be provided that step A2 includes storing a record of the set of TT transmission times found.

It may be provided that the step A2 comprises steps:
- A21: a computation, for the found set, of a staircase curve for each output port identified as being the output port of a node of the network such that the first set of flow passes through the considered output port,
- A22: for each output port considered in step A21, an approximation of the staircase curve by a linear curve,
- A23: for each output port considered in step A21, an intersection of the staircase curve with the linear curve,
- A24: for an output port considered in step A21, determining an impact of a flow passing through the output port on the basis of the intersection of the staircase curve with the linear curve, and wherein the first selection in step A11 includes identifying one of the flows of the first set of flows on the basis of the impact of said flow being quantified as large.

The invention refers also to a computer network, wherein the network is a time-triggered, TT, network or a time-sensitive, TSN network, wherein said computer network comprises components, like nodes and starcouplers or other components that communicate messages between different components in the system, wherein said components communicate flows including time-triggered, TT flows, and rate-constrained, RC flows, each such flow comprising messages, respectively TT messages and RC messages, and wherein components of said network communicate time-triggered messages according to a schedule and based on a global, network-wide time, and wherein said components communicate rate-constrained, RC messages, wherein for each of said TT and RC messages real-time requirements are provided, wherein the network is adapted to include means to generate a schedule generated with a method described above.

The invention further relates to a computer program comprising program code means for performing the steps of the described method when said computer program is run on a computer.

Finally the invention relates to a computer program product comprising program code means stored on a computer readable medium for performing the method when said computer program product is run on a computer.

BRIEF DESCRIPTION OF THE FIGURES

In the following, in order to further demonstrate the present invention, illustrative and non-restrictive embodiments are discussed, as shown in the drawings, which show.

DETAILED DESCRIPTION

We discuss some of the many implementations of the invention next. If not stated otherwise, all details described in connection with a specific example are not only valid in connection with this example, but apply to the general scope of protection of the invention.

Figure 1:
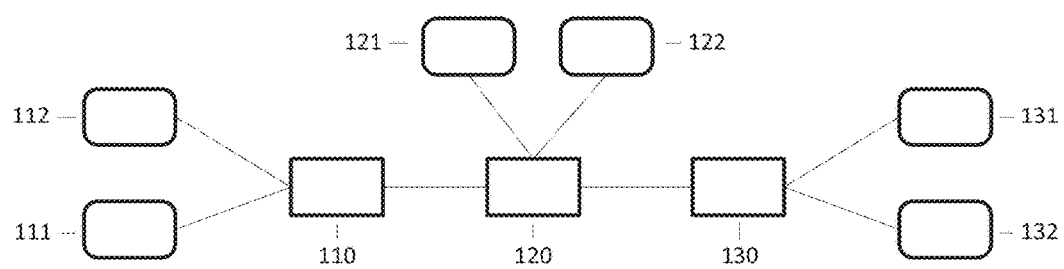
FIG. 1 an example of a time-triggered network,
FIG. 2 the periodic transmission of TT messages,
FIG. 3 a detailed representation of the transmission cycle depicted in FIG. 2,
FIG. 4 an example of computing of a TT flows arrival curve,
FIG. 5 the computation of gain functions,
FIG. 6 the approximation of a gain function,
FIG. 7 an example of a switch architecture,
FIG. 8 an example of a traffic model, and
FIG. 9 an example of a use case.

FIG. 1 shows an example of a time-triggered network which comprises or consists of three time-triggered star couplers (i.e. switches) 110, 120, and 130, and six nodes (i.e. end systems) 111, 112, 121, 122, 131, 132. All systems are connected via lines (which preferably are bidirectional) as shown in the figure and have a common time-base, for example as defined in TTEthernet (Institute of Electrical and Electronics Engineers 2018). Time-triggered (TT) messages are transmitted following a pre-configured global cyclic schedule in coexistence with other traffic (rate-constrained and best effort traffic).

A global distributed schedule determines exact points in time for the transmission of TT messages between the network systems (also denoted as "devices" or "components"; such systems are, for example, the mentioned nodes and star couplers), in a way that the transmissions through the shared lines is realized without contention. The calculation of the schedule is computationally intense, and therefore it is typically performed offline (i.e. prior to the system start-up) and distributed fully or partially to each of the systems of the network. At run-time, the global time base, within a known precision, is available to all systems, and used to execute the schedule in a cyclic and coordinated manner.

Non-scheduled traffic is transmitted during the sparse time between scheduled transmissions, in a way that the interference to scheduled transmissions is either avoided or bounded to a known maximum delay.

The transmission of scheduled messages is logically organized according to the concept of virtual links (VL). A VL defines one sender node (i.e. end system) and one or multiple receivers, as well as a physical path between them. The transmission of messages in a VL originates at the sender and propagates through the physical path (communication lines) until the receiver end system nodes are reached. Each of these propagation steps implies a scheduled transmission after the reception of the previous message. Additional constraints may be provided for VLs, for example a maximum end-to-end transmission deadline, referring to the maximum allowed interval for the propagation of messages—from sender to receiver(s).

A time-triggered message, characterized by a virtual link, has the following attributes:
A sender node
One or several receiver nodes
A period
A maximum message size
A maximum end-to-end latency A rate-constrained message, characterized by a virtual link, has the following attributes:

A sender node

One or several receiver nodes

A minimum inter-arrival time

A maximum message size

A maximum end-to-end latency

A maximum jitter

Let $vl_a$ be a TT virtual link with sender node 121 and receiver node 131 in the network depicted in FIG. 1. The network path is hence composed by the sequence {121, 120, 130, 131}, as extracted from FIG. 1. Let the period as well as the end-to-end delay of $vl_a$ be 100 ms.

Figure 2:
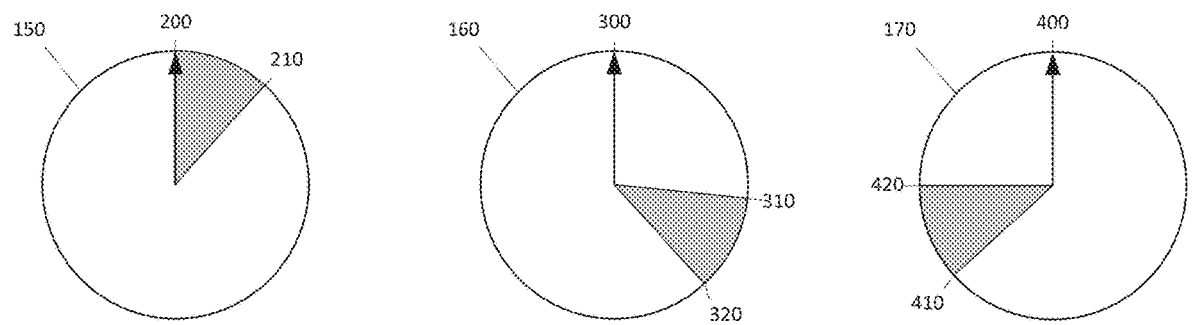

FIG. 2 illustrates the periodic transmission of TT messages from $vl_a$ within the transmission cycles of the three nodes conforming the respective network path (subfigures 150, 160, and 170). Note that in this example only the transmission events are scheduled, hence node 131, the receiver, does not appear. Respectively, 150 represents the cyclic transmission of messages from $vl_a$ in node 121, 160 that in node 120, and 170 in node 130. Each of the subfigures represent a time cycle of 100 ms starting from the top most point in time (200, 300, and 400) and progressing clockwise. The clock is synchronized globally at every cycle; hence the time progression is homologous for all systems, within a known synchronization precision.

In essence, at time 200 a transmission event for a TT message of $vl_a$ occurs at node 121 which initiates the transmission of a message taking place until time 210. Node 120 receives the message and transmits the succeeding message at time 310, being the transmission finished by, at most, 320. Similarly, node 130 transmits a succeeding message at 410, finishing by 420. This transmission cycle repeats endlessly in a coordinated manner.

Note that event 310 can only occur after event 210, as the message transmission in node 120 directly depends on the previous reception of the message transmitted by node 121. Analogously, event 410 depends on the occurrence of event 320. In essence, for the second and following messages propagated along the network path of a VL, the transmission can only be initiated after the previous message of the VL has arrived at the current node.

Figure 3:
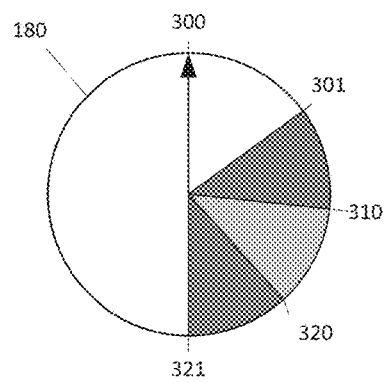

FIG. 3 provides a detailed representation of the transmission cycle depicted in FIG. 2, including all other scheduled transmissions in the same communication line for node 120 (dark gray), in addition to those of $vl_a$ (light gray) already depicted in FIG. 2. We observe that additional transmissions occur between events 301-310, and 320-321. Note that a transmission cycle defines the outgoing transmissions of a message towards one single communication line of the respective node (often referred as ports). Therefore, 180 depicts only the transmission cycle of node 120 for the communication line between nodes 120 and 130. Also note that similarly to the sequential transmissions depicted in FIG. 2, the transmissions of messages shown in FIG. 3 have dependencies to previous transmissions from nodes 121, 122 or 110 as part of VL paths traversing node 120.

The schedule of the TT frames on the timeline may have a major impact on the delays experienced by RC flows since TT traffic has a higher priority. Typically, the end-to-end latency of RC messages in such networks is analyzed through methods like network calculus (A. Van Bemten, W. Kellerer. 2016. *Network Calculus: A Comprehensive Guide*. TUM. https://mediatum.ub.tum.de/doc/1328613/1328613.pdf.). An extension of this analysis which considers the TT message schedule is presented in. A preferred timing analysis, which may be used in this invention, is based on the Network Calculus framework [L. Zhao, P. Pop, Q. Li, J. Chen, and H. Xiong, "Timing analysis of rate constrained traffic in TTEthernet using network calculus," Real-Time Systems, 2017.] which may be used to compute upper delay and backlog bounds. These bounds depend on the traffic arrival described by a so-called arrival curve a, which represents the maximum amount of data that can arrive in any time interval, and on the resource availability described by a curve, the so-called minimum service curve 3, which represents the minimum amount of data that can be sent in any time interval.

Proposed Method

The schedule of the TT frames on the timeline may have a major impact on the delays experienced by RC flows since TT traffic has a higher priority. According to the present invention it is checked that the RC end-to-end latencies computed with the current TT schedule are fulfilling the RC deadlines, using a feedback loop that preferably uses an RC network calculus analysis (A. Van Bemten, W. Kellerer. 2016. *Network Calculus: A Comprehensive Guide*. TUM. https://mediatum.ub.tum.de/doc/1328613/1328613.pdf.) to check that the RC end-to-end latencies computed with the current TT schedule are fulfilling the RC deadlines. If the RC latencies are larger than the RC deadlines, the problematic TT messages are rescheduled.

Evenly spacing out TT message placement may lead to a lower impact on RC message end-to-end latencies. Hence, it may be provided that an optimization metric is built that tries to evenly space out TT frames on the timeline and use optimization objectives to drive the modification of the TT message schedule.

Firstly, all the TT flows are scheduled, preferably according to said optimization metric. Secondly, an RC analysis is provided to determine if the RC traffic fulfills the deadline requirements. If this is the case, the method/algorithm stops. If this is not the case, the algorithm identifies the TT messages most likely to be causing delays and attempt to find a better offset, i.e., a modification of transmission times of identified TT messages, preferably using an optimization metric. This second step is repeated until an appropriate schedule is found or a stopping condition is reached.

The search may stop when a set of offsets fulfilling the deadline conditions is found or when the search algorithm has tried to reschedule all the possible flows without finding an unexplored set of offsets.

Figure 4:
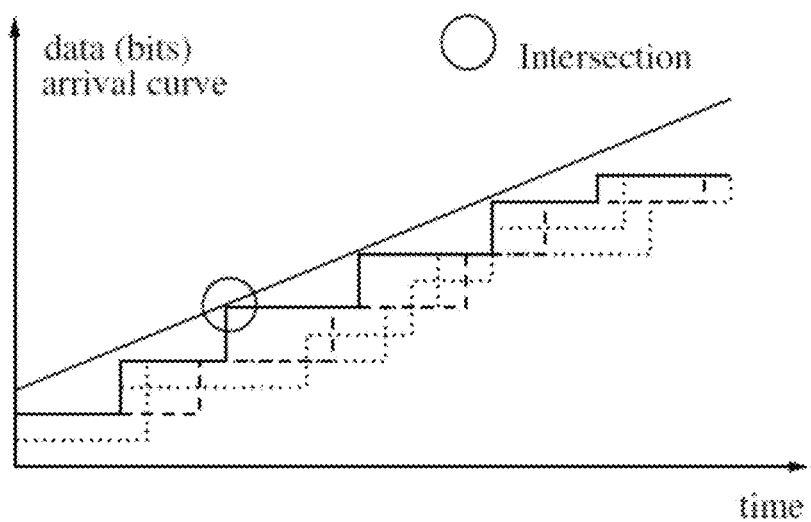

Identification of the TT Message to Reschedule (FIG. 4)

The impact of TT flows may be represented by an arrival curve of the TT traffic, which may be computed using formulas detailed in (L. Zhao, P. Pop, Q. Li, J. Chen, and H. Xiong, "Timing analysis of rate constrained traffic in TTEthernet using network calculus," Real-Time Systems, 2017.). The main aspect is to compute the impact of TT flows in all possible situations and keep the maximum values, as illustrated in FIG. 4. The dotted lines in FIG. 4 are the different situations and the plain line staircase represents the maximum of the dotted lines, representing the final TT flows maximum arrival curve. From this staircase arrival curve, a linear arrival curve may be approximated. The rate [the increase of the linear curve] of the linear curve is the same as the rate of the staircase curve over a period. Concerning the initial burst [the value of the linear curve at t=0] of the linear curve, it is computed such as the linear curve is always superior or equal to the staircase curve, with at least one intersection, as illustrated in FIG. 4. As a result, by modifying the value of the offset associated to the staircase intersection point, the value of the burst of the linear curve may be reduced, and consequently, the impact of TT traffic on RC flows is reduced. A so-called diversification list may be used to keep track of TT flows that have already been explored and changed in order not to run into an endless loop by trying to modify the schedule of the same TT flow(s). To select the flow most likely to have the most impact, the number of times a flow is an intersection can be computed and the flow with the most occurrences that is not in the diversification list may be selected. Finally, if no flow has been found, the first flow in the list of TT flows that is not in the diversification list will be selected.

Figure 5:
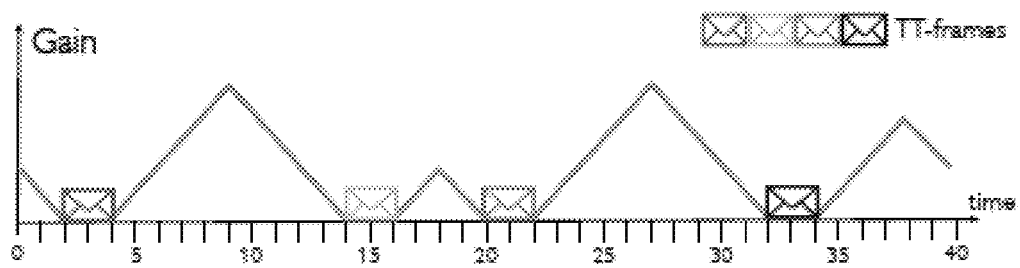

Generation of the TT Offsets (FIG. 5)

To compute the offset leading to a minimum impact of TT flows on RC flows, it may be provided that the frames are spread over a hyperperiod (that is the least common multiple of all scheduled TT message periods), in order to reduce the initial burst of the aggregated TT flows. Here, the period is 10 and the hyperperiod HP is 40.

To achieve this goal, in particular in each output port with TT flows, gain functions between the already scheduled TT frames may be defined, as illustrated in an example in FIG. 5. When looking at the time-line of scheduled transmissions between 0 and the hyperperiod, we denote $t_k^{end}$ to be the end of the transmission of a TT frame and $t_{k+1}^{start}$ to be the start of the next transmission of a TT frame on the time-line. For each TT frame k already scheduled (not including the TT frames of the TT flow identified as described above, which may be denoted by TT flow i, the gain functions are determined by:

$$\forall\, t_k^{end} \le t < \frac{t_k^{end} + t_{k+1}^{start}}{2},\ gain(t) = t - t_k^{end}$$

$$\forall\, t_{k+1}^{start} \ge t \ge \frac{t_k^{end} + t_{k+1}^{start}}{2},\ gain(t) = t_{k+1}^{start} - t$$

For a selected TT flow from the identification step its transmission times along the route may be modified as follows:
- the at least one, preferably all of the following correctness conditions have to be kept:
  Contention-Free Constraints
  Path-Dependent Constraints
  Simultaneous Relay Constraints
  End-to-end Transmission constraints
  Application Level constraints
  Protocol-Control Flow Constraints
  Domain-Specific constraints
  An optimization condition for the frames of the identified TT flow that drive the placement of the frames to be as close as possible to the maximum gain for that frame is added.

The above conditions are described in detail in [Steiner, W. 2010. "An evaluation of SMT-based schedule synthesis for time-triggered multi-hop networks." RTSS.].

Optionally, a condition for each port that the new offset is different from the old offset may be added.

Figure 6:
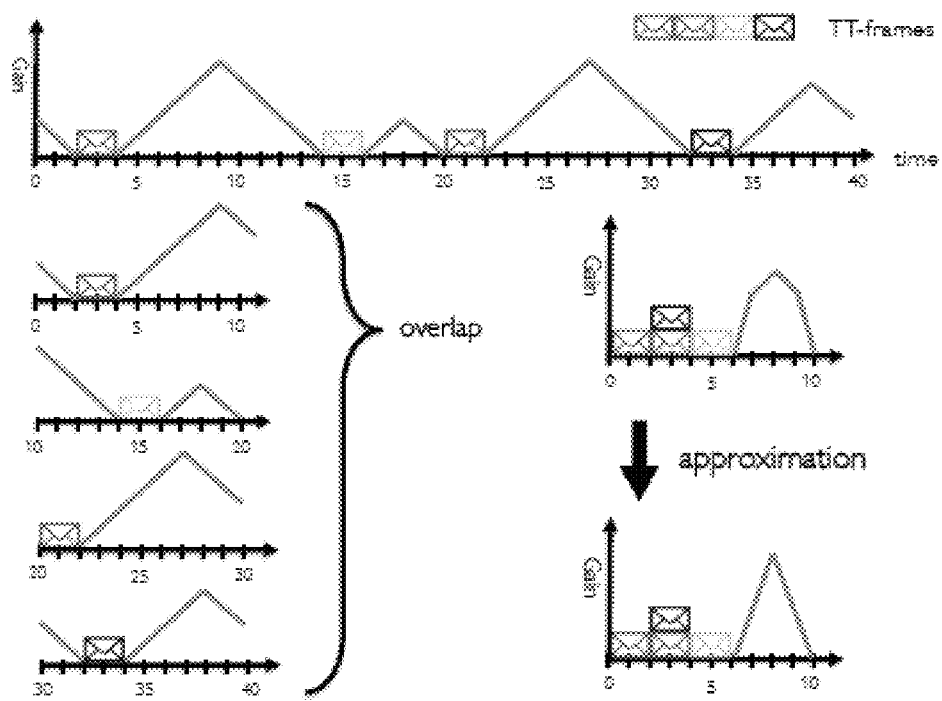
Figure 7:
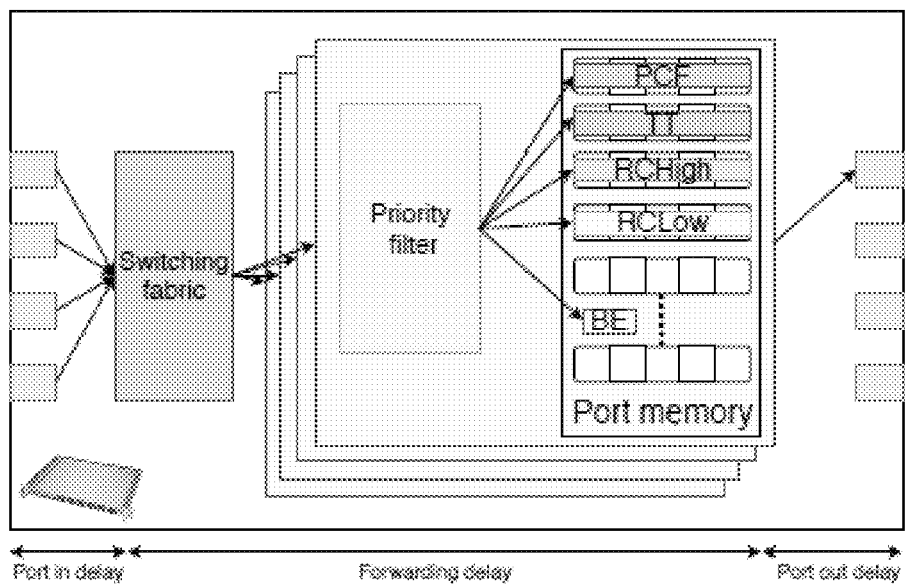
Figure 8:
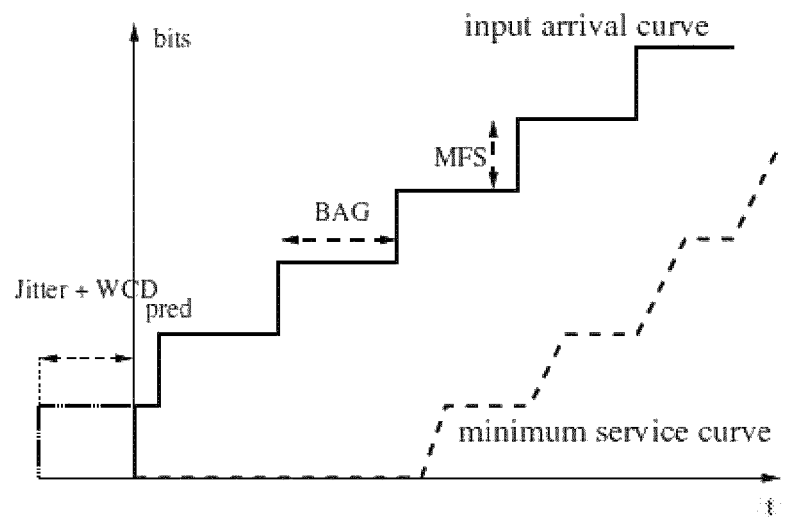
Figure 9:
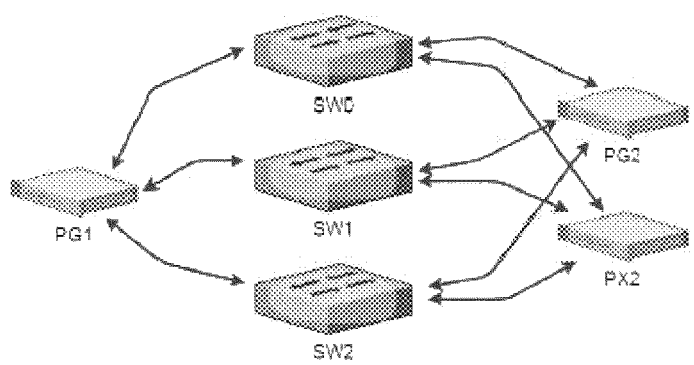

Approximation (FIG. 6)

The method presented above may require a large number of optimization functions. In between each two scheduled TT frames, a number of optimization functions is necessary to define the two linear parts of the gain, i.e., to define the upper and lower bounds of the new offset and the value associated with the gain. When the number of TT flows increases, so does the number of assertions needed, resulting in an increased runtime of the scheduler.

Accordingly, the following may be provided: only a period Ti of a flow i (the flow to be re-scheduled) is considered and the values excluded by the currently scheduled frames are computed, i.e., if a frame is being transmitted, or if the inter-frame gap is too small to transmit the frame of flow i. Then, the gains, preferably only on the acceptable times, are summed up, as illustrated in FIG. 6. Finally, to further reduce the number of linear parts of the gain function (which means reducing the number of assertions and hence the computation time), the remaining gain functions may be approximated to keep only a maximum of two linear functions per interval [between two already scheduled frames or between 0 and a frame or between a frame and the hyperperiod (in particular, between 0 and the end of the hyperperiod)], as illustrated in FIG. 6, here with Ti=10 and hyperperiod HP=40.

In the example described in FIG. 5 and FIG. 6, the number of assertions has been reduced from 24 to 6, which should improve the timing performances.

DETAILED EXPLANATION OF AN EXAMPLE METHOD

In the following a concrete example of the method according the invention will be explained. All details, even if they are in the context of this example described as mandatory, may be provided or implemented in the most general scope of the invention.

REFERENCES

[1] Clark Barrett, Roberto Sebastiani, Sanjit Seshia, and Cesare Tinelli. Satisfiability modulo theories. In *Handbook of Satisfiability*, volume 185. IOS Press, 2009.

[2] Nikolaj Bjørner, Anh-Dung Phan, and Lars Fleckenstein. vz—an optimizing SMT solver. In *Proc. TACAS*. Springer, 2015.

[3] Anne Bouillard, Laurent Jouhet, and Eric Thierry. Service curves in Network Calculus: dos and dont's. Research report, INRIA, 2009.

[4] M. Boyer, I I. Daigmorte, N. Navet, and J. Migge. Performance impact of the interactions between time-triggered and rate-constrained transmissions in TTEthernet. In *Proc. ERTS*, 2016.

[5] Marc Boyer, Jorn Migge, and Nicolas Navet. An efficient and simple class of functions to model arrival curve of packetised flows. In *Proc. WCTT*, 2011.

[6] Silviu S. Craciunas and Ramon Serna Oliver. Combined task- and network-level scheduling for distributed time-triggered systems. *Real-Time Systems*, 52(2), 2016.

[7] Hermann Kopetz, Astrit Ademaj, Petr Grillinger, and Klaus Steinhammer. The Time-Triggered Ethernet (TTE) Design. *Proc. ISORC*, 2005.

[8] J. Y. Le Boudec and P. Thiran. *Network calculus: a theory of deterministic queuing systems for the internet*. Springer-Verlag, 2001.

[9] Roberto Sebastiani. Lazy satisfiability modulo theories. *JSAT*. 3(3-4):141-224, 2007.

[10] Ramon Serna Oliver, Silviu S. Craciunas, and Wilfried Steiner. IEEE 802.1Qbv Gate Control List Synthesis using Array Theory Encoding. In *Proc. RTAS*. IEEE, 2018.

[11] Wilfried Steiner. An evaluation of SMT-based schedule synthesis for time-triggered multi-hop networks. In *Proc. RTSS*. IEEE, 2010.

[12] L. Zhao, P. Pop, Z. Zheng, and Q. Li. Timing analysis of AVB traffic in TSN networks using network calculus, In *Proc. RTAS*, 2018.

[13] L. X. Zhao, H. G. Xiong, Z. Zheng, and Q. Li. Improving worst-case latency analysis for rate-constrained traffic in the time-triggered ethernet network. *IEEE Communications Letters*, 18(11), 2014.

[14] Luxi Zhao, Paul Pop, Qiao Li, Junyan Chen, and Huagang Xiong. Timing analysis of rate-constrained traffic in TTEthernet using network calculus. *Real-Time Systems*, 53(2):254-287, 2017.

We claim:

1. A method for generating a schedule for the transmission of time-triggered, TT, messages in a network comprising a TTEthernet or TSN network, wherein the network comprises components comprising nodes and starcouplers, wherein the components of said network communicate time-triggered messages according to said schedule and based on a global, network-wide time, and wherein said components communicate rate-constrained, RC messages, wherein for each of said RC messages real-time requirements are provided, wherein the method comprises the steps of:
   Step 1: setting the transmission time of all TT messages which are communicated in the network, and
   Step 2: executing a search function to find a set of TT transmission times so that real-time requirements of all RC messages are fulfilled, and when all real-time requirements or at least real-time requirements for defined RC messages are fulfilled, generating in
   Step 3: the schedule based on the transmission times retrieved in Step 2, or executing Step 2 again in case that not all real-time requirements or not all real-time requirements for the defined RC messages are fulfilled.

2. The method according to claim 1, wherein the transmission times of all the TT messages are set for one TT flow after the other, using an optimization function with an SMT-solver.

3. The method according to claim 1, wherein the real-time requirements for the RC messages comprise an end-to-end delay bound, and wherein the search function in Step 2 is loop based with the following loop-steps:
   loop-step 1: comparing the worst-case end-to-end delay bound of each RC flow with its corresponding deadline, wherein in case that the delay bound is larger than the corresponding deadline according to the RC requirements for said RC flow, the next two loop steps are executed:
   loop step 2: identifying TT transmission times to be modified, and
   loop step 3: computing of the transmission times of the selected TT flows in loop step 2 for each output port of the flow path of a selected TT flow using an optimization function within the SMT-solver.

4. The method according to claim 1, wherein a record of the previously explored option can be kept, which may be used to guide the search into unexplored parts of the solution space and/or to be used as an additional stopping condition for the search.

5. The method according to claim 1, wherein the search function comprises the identification of TT transmission times to be modified based on a Network Calculus framework and an arrival curve in each output port, which represents the maximum amount of data that can arrive in an output port in any time interval of TT traffic detailed.

6. The method according to claim 5, wherein a staircase curve for each output port of the network crossed by TT flows is computed, and wherein the staircase curves are approximated by linear curves, and wherein TT flows having a large impact on the real-time requirements of the RC flows are identified by intersecting a staircase curve and its linear approximation, the flow most likely to have a large impact on RC flows is identified.

7. The method according to claim 1, wherein the computation of the TT transmission times is executed with the use of an optimization function, which is added within the SMT-solver, and wherein a set of TT flows with a hyper-period, HP, which is the least common multiple of all flow periods of all TT flows, is considered, and wherein for each output port, where TT flows occur, a gain function is defined.

8. The method according to claim 7, wherein for the computation of transmission times gain functions between the already scheduled TT frames are determined, wherein with $t^{end}_k$ being the end of a frame transmission and $t^{start}_{k+1}$ being the start of the next transmission, for each TT frame already scheduled, the gain functions are determined by:

$$\forall\, t^{end}_k \leq t < \frac{t^{end}_k + t^{start}_{k+1}}{2},\ \text{gain}(t) = t - t^{end}_k$$

$$\forall\, t^{start}_{k+1} \geq t \geq \frac{t^{end}_k + t^{start}_{k+1}}{2},\ \text{gain}(t) = t^{start}_{k+1} - t$$

wherein for each period of a flow of interest in each output port, the gain functions are summed and the abscise of the maximum value of the summed gains is selected by the SMT-solver as the transmission time in the output port.

9. The method according to claim 7, wherein only gain functions in the acceptable times are summed, and wherein the resulting summed gain functions are approximated, in each output port, in that the abscise of the maximum value of the approximated gains is selected by the SMT-solver, as the transmission time in the output port.

10. A computer network comprising a TTEthernet or TSN network, wherein the network comprises components comprising nodes and starcouplers, wherein components of said network communicate time-triggered messages according to a schedule and based on a global, network-wide time, and wherein said components communicate rate-constrained, RC messages, wherein for each of said RC messages real-time requirements are provided, wherein the schedule is generated with a method according to claim 1.

11. A computer program comprising program code for performing all steps of claim 1 when said program is run on a computer.

12. A computer program product comprising program code stored on a computer readable medium for performing the method of claim 1 when said program product is run on a computer.

* * * * *